United States Patent [19]

Marginean et al.

[11] Patent Number: 4,675,705

[45] Date of Patent: Jun. 23, 1987

[54] HEAT SENSITIVE COATING

[75] Inventors: Barry L. Marginean, Scottsville; Warren A. Hookway, Jr., Canandaigua, both of N.Y.

[73] Assignee: Labelon Corporation, Canandaigua, N.Y.

[21] Appl. No.: 742,961

[22] Filed: Jun. 10, 1985

[51] Int. Cl.[4] ........................ B41M 5/18; C09D 11/14

[52] U.S. Cl. ........................................ 503/209; 106/21; 106/25; 346/208; 346/214; 346/216; 346/217; 346/221; 346/225

[58] Field of Search ............... 346/208, 209, 214, 216, 346/221, 225, 217; 106/14.5, 21, 25, 30

[56] References Cited

U.S. PATENT DOCUMENTS

| | | | |
|---|---|---|---|
| 4,138,357 | 2/1979 | Igarashi | 252/188.3 |
| 4,289,535 | 9/1981 | Marginean | 106/19 |
| 4,399,188 | 8/1983 | Yamato et al. | 428/320 |
| 4,431,706 | 2/1984 | Sato | 346/209 |
| 4,467,339 | 8/1984 | Asami et al. | 346/214 |

FOREIGN PATENT DOCUMENTS

| | | | |
|---|---|---|---|
| 1563175 | 3/1980 | United Kingdom | 346/209 |
| 1565784 | 4/1980 | United Kingdom | 346/209 |
| 2071860A | 9/1981 | United Kingdom | 346/209 |
| 2071349A | 9/1981 | United Kingdom | 346/209 |
| 2974335A | 10/1981 | United Kingdom | 346/209 |

*Primary Examiner*—Bruce H. Hess
*Attorney, Agent, or Firm*—Bacon & Thomas

[57] ABSTRACT

An improved heat sensitive coating composition and heat sensitive paper for thermal printing containing the composition are disclosed. The composition contains a color-forming amount of a finely divided solid colorless or pale colored chromogenic fluoran dyestuff, a color-developing amount of a finely divided mixture of benzyl p-hydroxy benzoate and a halogenated derivative of 4,4′-isopropylidenediphenol and a carrier composition.

10 Claims, No Drawings

HEAT SENSITIVE COATING

BACKGROUND OF THE INVENTION

The present invention is directed to an improved heat sensitive coating composition and heat sensitive paper for thermal printing devices containing the composition. The composition is particularly well suited for heat sensitive paper used in high speed facsimile copiers.

In the past several years, facsimile copiers have become a popular way of transmitting print messages between remote locations over telephone lines. Due to the high speed at which facsimile copiers operate, high quality thermal responsive recording paper is required to provide clear reproduction of the transmitted images.

In our previously granted U.S. Pat. No. 4,289,535, the disclosure of which is hereby incorporated by reference, there is disclosed a heat sensitive composition comprised of a chromogenic basic triphenylmethane dyestuff and an acidic phenolic color-developer in a carrier composition. More specifically, the triphenylmethane dyestuff is a 3,3-bisarylphthalane derivative and the color-developer is a bisphenol such as bisphenol A (4,4'-isopropylidenediphenol). The carrier for the dyestuff and color-developer is a mixture of a water soluble anionic polysaccharide gum, such as gum arabic, and sucrose benzoate which functions as a stabilizer.

U.S. Pat. Nos. 4,138,357 and 4,399,188 disclose heat-sensitive compositions containing a thermochromic dyestuff and an ester of hydroxybenzoic acid as the color-developer.

SUMMARY OF THE INVENTION

We have now discovered a heat sensitive composition which exhibits improved image resolution and retention when used in high speed facsimile copiers. The composition comprises:

a color-forming amount of a finely divided, solid colorless or pale colored chromogenic fluoran dyestuff, a color-developing amount of a finely divided mixture of benzyl p-hydroxybenzoate and a halogenated derivative of 4,4'-isopropylidenediphenol, which at thermal printing temperatures is at least partially fluidized and capable of a color-forming reaction with said dyestuff, and a carrier composition in which said dyestuff and color-developing mixture are distributed comprising a substantially water soluble anionic polysaccharide gum and a stability enhancing amount of sucrose benzoate.

The carrier composition may also include image stabilizers, fillers and various additional components for enhancing properties of the composition.

DETAILED DESCRIPTION OF THE INVENTION

The colorless or pale colored chromogenic fluoran dyestuffs used in the composition of the invention are the fluoran dyestuffs which have been used in heat sensitive compositions, for example, 3-dimethylamino-7-methoxyfluoran, 3-diethylamino-7-methoxyfluoran, 3-diethylamino-6-methoxyfluoran, 3-diethylamino-7-chlorofluoran, 3-diethylamino-7-chloro-6-methylfluoran, 3-diethylamino-6,8-dimethylfluoran, 3-diethylamino-7-acetylmethylaminofluoran, 3-diethylamino-7-methylaminofluoran, 3,7-diethylaminofluoran, 3-diethylamino-7-dibenzylaminofluoran, 3-diethylamino-7-dibenzylaminofluoran, 3-diethylamino-7-methylbenzylaminofluoran, 3-diethylamino-7-phenylamino-6-methylfluoran, 3-diethylamino-7-chloroethylmethylaminofluoran, 3-diethylamino-7-dichloroethylaminofluoran, etc. Preferred fluoran dyestuffs for use in the composition of the invention are 6'-(cyclohexylmethylamino)-3'-methyl-2'-(phenylamino)-spiro [isobenzo-fluoran-1-(3H),9'-(9H)xanthene]-3-one having the formula:

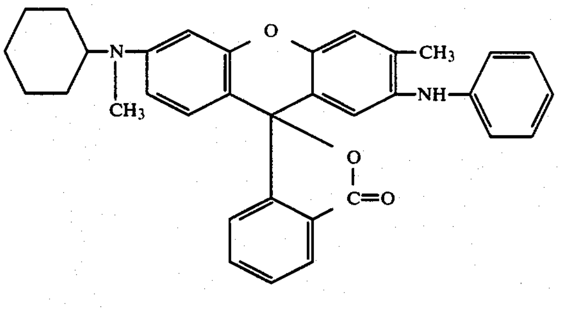

and 6'-(butylethylamino)-3'-methyl-2'-(phenylamino)-spiro [isobenzo-fluoran-1-(3H),9'-(9H)xanthene]-3-one having the formula:

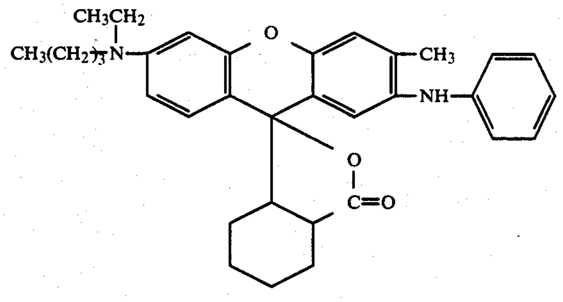

The color-developing agent which is the crux of the invention is a combination of the benzyl ester of p-hydroxybenzoic acid, often referred to as benzyl paraben and a halogenated derivative of 4,4'-isopropylidenephenol, often referred to as bisphenol A, most preferably tetrabromo bisphenol A.

The particular fluoran dyestuff selected for use in the composition will, of course, vary depending on the desired color of the color marks which are produced on the heat sensitive paper during thermal printing. Similarly, the amount of the dyestuff and color-developing agent will vary, largely depending upon the particular dyestuff being used and the desired shade and intensity of color in the produced colored marks.

Generally, the amount of dyestuff present in the composition will vary from 5 to 25%, by weight, preferably from 5 and 10% and most preferably from 6 to 8%. The amount of developing agent will vary from 15 to 25%, by weight, preferably from 17 to 23% and most preferably from 19 to 21%. In these amounts, the weight ratio of benzyl paraben to tetrabromo bisphenol A will vary between about 2:1 to 4:1 with a weight ratio of about 3:1 being most preferred.

Both the dyestuff and the color developing agent must be distributed through the composition in finely divided form, preferably in the form of particles having a particle size of from about 1 to about 3 microns. Various additives are added to the finely divided particles to prepare a coating composition. Substantially water soluble anionic polysaccharide gums modified by additions of stabilizing amounts of sucrose benzoate as a binder-carrier material is particularly preferred, since, as taught in our previous U.S. Pat. No. 4,289,535, it provides excellent properties in terms of increased stability.

The substantially water soluble anionic polysaccharide gums which can be used as the binder and carrier material in the composition include gum arabic, which is most preferred, and varying amounts of gum karaya, water soluble alginates, agar and agaroid gums, carrageen and carrageenan and carboxymethyl cellulose. The viscosity of the composition can be readily adjusted to any level by varying the amounts of the polysaccharide gums which are used in combination with gum arabic.

Gum arabic is particularly preferred as the polysaccharide gum binder/carrier since even when used in relatively high concentrations, it does not provoke an excessive viscosity increase in the aqueous formulation of the coating composition and facilitates application and drying of the coating on the paper.

The amount of the substantially water soluble anionic polysaccharide gum and sucrose benzoate which is incorporated into the composition may vary depending upon such factors as the desired viscosity of the composition for application to the paper substrate. When gum arabic is selected as the binder, it will be present in the composition in amounts ranging from 10 to 25%, by weight, preferably from 16 to 25%. Sucrose benzoate will be present in amounts ranging from 1 to 10%, by weight, preferably from 1 to 3%.

Various fillers such as titanium dioxide, zinc stearate, calcium carbonate, aluminum hydrate, waxes, zeolites, may also be included in the composition for enhancement of specific properties, such as reduction of residue, whiteness, reduction of stick, print enhancement, etc.

The filler materials are generally incorporated into the composition in amounts no greater than 10%, by weight, for each filler, with the exception of calcium carbonate which may be included in amounts ranging from 20 to 40%, by weight, and preferably from 25 to 30%.

In addition to the halogenated bisphenol A, which functions as a color-developer and image stabilizer, additional image stabilizers are advantageously included in the composition, most notably terephthalate esters, e.g., dimethyl, dibutyl and dibenzyl terephthalate. Resorcinol monobenzoate and phenyl-1-hydroxy-2-naphthoate have also shown good image stabilizing ability. Dimethyl terephthalate is particularly preferred due to its ability to impart a high degree of image stability when used in conjunction with the color developing agent employed in the composition of the invention. Typically, from 5 to 10%, by weight, of the image stabilizer component is required to achieve good image stability with the composition of the invention.

Additives other than those previously mentioned, can also be included in the composition without departing from the spirit of the invention. For example, wetting agents, defoamers, dispersing agents and optical brighteners can be included in the composition if desirable. Examples of specific compositions are found in the working examples contained below.

To prepare the coating composition of the invention, two or possibly three separate mixtures are first prepared; namely a chromogenic mixture containing the chromogenic dyestuff, a portion of the substantially water soluble anionic polysaccharide gum, and some filler material; a color-developing mixture containing the benzyl paraben/halogenated bisphenol A color-developing combination and the remaining portion of the water soluble anionic polysaccharide gum and other fillers. Optionally, filler may be included in a third mixture to facilitate mixing of the ingredients. The mixtures are prepared in this manner so that they can be stored without fear of a reaction occurring. To form a heat-sensitive coated paper, the mixtures are either mixed together prior to application to the paper or are applied separately to the paper to form successive layers of coating thereon.

The heat-sensitive record sheet materials according to the present invention comprise a support sheet which is coated on one or both of its surfaces and/or impregnated with the heat-sensitive composition.

The preferred support sheet material is paper, preferably a thin relatively opaque white paper sheet, from 12–16#/ream 17×22×500 paper.

However, the heat-sensitive composition according to the present invention may also be applied to sheet or bands of film-like polymeric material, woven material or laminated material and other weight papers to form a heat-sensitive record material.

The paper sheet may be coated and/or impregnated with one or more layers of a single heat-sensitive composition containing both the chromogenous compound and the color-developing combination of benzyl paraben and halogenated bisphenol A distributed therein; or, the color-developing combination and the chromogenous compounds may each be contained in a different layer of a multilayer coating, e.g., the paper may carry a first base coat of a coating mixture containing the color-developing combination covered by a second coat of a coating mixture containing the chromogenous compound.

Alternatively, a first support sheet coated with the coating mixture containing the color-developing combination may be placed into face-to-face relationship with a second support sheet coated with the coating mixture containing the chromogenic compound.

The total amount of coating composition per support material may vary depending upon the specific type of paper and the specific compositions which are used, as well as the desired printing and processing behaviour of the final product.

Satisfactory results are generally obtained with an amount of from about 3.5 to 7.5, preferably from about 4.3 to about 6.2 grams, of total coating composition per $m^2$ of support paper.

If desired, the heat-sensitive papers according to the present invention are prepared by conventional paper coating methods, e.g., by coating the support paper with an aqueous dispersion of the coating composition by means of rollers, spray brushes or in any other known manner and allowing the coating to dry.

For preparing the aqueous dispersion of the coating composition a first mixture containing the color-developing combination and a portion of the substantially water soluble anionic polysaccharide gum, the sucrose benzoate and any other ingredients each are separately ground with water, suitably at a concentration of between about 10 and about 50%, sufficiently to reduce the solids to an average particle size of several microns, preferably of about between 1 and about 3 microns.

The resulting two dispersions may be mixed together in a single coating composition which may be applied to the paper, optionally after being further diluted with water. Alternatively, the two dispersions may be applied to the paper separately to form different layers of coating.

As previously stated, a primary feature of the invention is the discovery that the combination of benzyl paraben with a halogenated derivative of bisphenol A provides a superior color developing agent for heat-sensitive compositions, particularly for those used in high speed facsimile copiers. A further important aspect of the invention is the discovery of the image stabilizing effect of the terephthalate esters, particularly dimethyl terephthalate. To illustrate this and other aspects of the invention, the following Example is provided, it being understood that its purpose is entirely illustrative and is in no way intended to limit the scope of the invention.

EXAMPLE

Heat-Sensitive Paper for Thermal Printing Devices

A chromogenic mixture (Mix A) of solids having the following composition was prepared:

| Mix A | Weight percent |
|---|---|
| Gum Arabic | 16.76 |
| Sucrose Benzoate | 8.37 |
| PSD-150* | 46.20 |
| Aluminum Hydrate | 28.67 |
| | 100.00 |

*6'-(cyclohexylmethylamino)-3'-methyl-2'-(phenylamino)-spiro[isobenzo-fluoran-1-(3H), 9'(9H)xanthene]-3-one.

A color-developing mixture (Mix B) of solids having the following compositions was prepared:

| Mix B | Weight percent |
|---|---|
| Gum Arabic | 22.75 |
| Benzyl Paraben | 22.75 |
| Calcium Carbonate | 30.70 |
| Titanium Dioxide | 1.28 |
| Zeolite ZLD-1000 | 4.93 |
| Dimethyl Terephthalate | 9.94 |
| Tetrabromo Bisphenol A | 7.65 |
| | 100.00 |

A third composition (Mix C) of solids of the following composition was prepared:

| Mix C | Weight percent |
|---|---|
| Zinc Stearate | 14.88 |
| Paraffin Wax | 42.56 |
| Calcium Carbonate | 42.56 |
| | 100.00 |

Mix A and Mix B were ground separately at a concentration of 20–45% in water to a particle size of 1–3 microns. Mix C was blended and dispersed in a mixer. The three mixes were blended together to give a final heat-sensitive coating with compositions as follows:

| Final Composition | Weight percent |
|---|---|
| Gum Arabic | 20.20 |
| Sucrose Benzoate | 1.67 |
| PSD-150 | 7.36 |
| Aluminum Hydrate | 4.58 |
| Benzyl Paraben | 16.20 |
| Titanium Dioxide | .92 |
| Zeolite ZLD-1000 | 3.50 |
| Dimethyl Terephthalate (DMT) | 7.09 |
| Tetrabromo Bisphenol A (TBBPA) | 5.42 |
| Zinc Stearate | 1.66 |
| Paraffin Wax | 4.76 |
| Calcium Carbonate | 26.64 |
| | 100.00 |

The heat sensitive coating composition was applied to a paper substrate at 1.0–1.6 lb/MSF.

The coating paper was tested yielding the following results:

| | Light | | | | Environmental 50/50 | | | | Heat 60° C. | | | |
|---|---|---|---|---|---|---|---|---|---|---|---|---|
| | Image | | Bkgd | | Image | | Bkgd | | Image | | Bkgd | |
| Composition | Initial | Δ | Initial | Δ | Initial | Δ | Initial | Δ | Initial | Δ | Initial | Δ |
| w/o DMT, TBBPA | 1.23 | −.22 | .04 | +.09 | 1.20 | −.12 | .04 | +.04 | 1.25 | −.32 | .04 | +.17 |
| w/ DMT w/o TBBPA | 1.20 | −.21 | .03 | +.10 | 1.25 | −.08 | .03 | +.05 | 1.25 | −.73 | .03 | +.24 |
| w/o DMT w/ TBBPA | 1.24 | −.13 | .04 | +.09 | 1.24 | −.03 | .04 | +.05 | 1.27 | −.48 | .04 | +.54 |
| w/ DMT w/ TBBPA | 1.25 | −.07 | .03 | +.08 | 1.22 | −.05 | .03 | +.05 | 1.24 | −.19 | .04 | +.19 |

Light = Maintained in ultraviolet light
Environmental 50/50 = Maintained in enclosed chamber held at 50° C., and 50% relative humidity
Heat 60° C. = Maintained in oven at 60° C.

While the present invention has been described in terms of certain preferred embodiments and exemplified with respect thereto, one skilled in the art will readily appreciate that various modifications, changes, omissions and substitutions may be made without departing from the spirit thereof. It is intended, therefore, that the present invention be limited solely by the scope of the following claims.

We claim:

1. A heat sensitive coating composition for a thermoresponsive printing or recording material comprising:

a color-forming amount of a finely divided solid colorless or pale colored chromogenic fluoran dyestuff, a color-developing amount of a finely divided mixture of benzyl p-hydroxybenzoate and a halogenated derivative of 4,4'-isopropylidenediphenol, which at thermal printing temperature is at least partially fluidized and capable of a color-forming reaction with said dyestuff, an image stabilizing amount of dimethyl terephthalate, and a carrier composition, in which said dyestuff, image stabilizing and color-developing mixture are distributed comprising a substantially water soluble anionic polysaccharide gum and a stability enhancing amount of sucrose benzoate.

2. The composition of claim 1, wherein said dyestuff is selected from the group consisting of 6′-(cyclohexylmethylamino)-3′-methyl-2′-(phenylamino)-spiro[isobenzo-fluoran-1-(3H),9′-(9H)xanthene]-3-one and 6′-(butylethylamino)-3′-methyl-2′-(phenylamino)-spiro[isobenzofluoran-1-(3H), 9′-(9H)xanthene]-3-one.

3. The composition of claim 2, wherein said dyestuff is present in said composition in an amount ranging from 5 to 25%, by weight, based upon the total weight of the composition.

4. The composition of claim 3, wherein said color-developing amount of a finely divided mixture of benzyl-p-hydroxybenzoate and the tetrabromo derivative of 4,4′-isopropylidenediphenol is between 15 and 25%, by weight, based upon the total weight of the composition.

5. The composition of claim 4, wherein the weight ratio of benzyl-p-hydroxybenzoate to the tetrabromo derivative of 4,4′-isopropylidenediphenol is between 2:1 and 4:1.

6. The composition of claim 1, wherein said halogenated derivative of 4,4′-isopropylidenediphenol is the tetrabromo derivative.

7. The composition of claim 1, further comprising one or more fillers selected from the group consisting of titanium dioxide, aluminum hydrate calcium carbonate, zinc stearate, paraffin wax, zeolite and mixtures thereof.

8. A heat sensitive recording sheet for thermal printing devices comprising a support sheet which carries on at least one of its surfaces the coating composition as defined in claims 1, 2, 3, 4, 5, 6 or 7.

9. A heat sensitive coating composition for a thermoresponsive printing or recording material comprising:

a color-forming amount of a finely divided solid colorless or pale colored chromogenic fluoran dyestuff, a color-developing amount of a finely divided mixture of benzyl p-hydroxybenzoate and tetrabromo 4,4′-isopropylidenediphenol, which at thermal printing temperature is at least partially fluidized and capable of a color-forming reaction with said dyestuff, an image stabilizing amount of dimethyl terephthalate, and a carrier composition, in which said dyestuff, color-developing and image stabilizing mixture are distributed, comprising a substantially water soluble anionic polysaccharide gum and a stability enhancing amount of sucrose benzoate.

10. A heat sensitive recording sheet for thermal printing devices comprising a support sheet which carries on at least one of its surfaces the coating composition as defined in claim 9.

* * * * *